US008162758B1

(12) United States Patent (10) Patent No.: US 8,162,758 B1
Powers et al. (45) Date of Patent: Apr. 24, 2012

(54) IMPLEMENTING VIDEO CONTESTS

(75) Inventors: Michael Powers, San Francisco, CA (US); Christoform Miller, San Francisco, CA (US); Saureen Shah, Foster City, CA (US); Angus Derocher, San Francisco, CA (US)

(73) Assignee: Google Inc., Mountain View, CA (US)

( * ) Notice: Subject to any disclaimer, the term of this patent is extended or adjusted under 35 U.S.C. 154(b) by 659 days.

(21) Appl. No.: 11/952,122

(22) Filed: Dec. 6, 2007
(Under 37 CFR 1.47)

Related U.S. Application Data

(60) Provisional application No. 60/868,929, filed on Dec. 6, 2006.

(51) Int. Cl.
*A63F 9/24* (2006.01)
(52) U.S. Cl. ............................................ 463/42; 705/12
(58) Field of Classification Search ............ 463/42; 705/12
See application file for complete search history.

(56) References Cited

U.S. PATENT DOCUMENTS

| 7,162,433 | B1 * | 1/2007 | Foroutan | 705/7.42 |
| 2002/0198763 | A1 * | 12/2002 | Pittelli | 705/10 |
| 2003/0171982 | A1 * | 9/2003 | Paul | 705/12 |

OTHER PUBLICATIONS

"Alltel and AtomFilms(R) Launch Film Contest for Wireless Phone Users; Contest on Atom Films Site Challenges Consumers to Submit Films Shot on Wireless Phones; Top 10 Entries Receive Prizes Ranging from $1,000 to $5,000," Alltel Wireless, News &Events, Press Release, Jun. 15, 2008.
"Comedy Central ® Launches Broadband Development Deal Competition with its Newest Venture "Comedy Central's Test Pilots"," Comedy Central, Apr. 10, 2006, [online] [Retrieved on Sep. 11, 2008] Retrieved from the internet <URL:http://www.comedycentral.com/shows/test_pilots/press_release/press/jhtml>.
"iFilm Short Film Contest—Top 10 Finalist," [online] [Retrieved on Sep. 11, 2008] Retrieved from the internet <URL:http://www.moviesonline.ca/movienews_3029.html>.
"Atom Films, Alltel sponsor "Are You Circle Worthy?" camera phone video contest," Reiter's Mobile TV Report, Jun. 14, 2006, [online] [Retrieved on Sep. 11, 2008] Retrieved from the internet <URL:http://www.mobiletelevisionreport.com/2006/06/atom_film_allte.html>.
"2005 Star Wars Fan Film Entries Online," Slashdot, Mar. 30, 2005, [online] [Retrieved on Sep. 11, 2008] Retrieved from the internet <URL:http://slashdot.org/arlicle.pl?sid=05/03/032257>.
""Show Us Your Junk" Contest," Web Feature, California College of the Arts, Apr. 6, 2006, [online] [Retrieved on Sep. 11, 2008] Retrieved from the internet <URL:http://www.cca.edu/about/press/2006/showusyour_junk>.

* cited by examiner

*Primary Examiner* — Omkar Deodhar
(74) *Attorney, Agent, or Firm* — Fenwick & West LLP

(57) ABSTRACT

A video hosting site allows a contest owner to specify parameters to be used for a contest. Examples of parameters include contest name, description, how the contest will be judged, who may enter the contest, etc. Once the parameters are set, a contest manager initiates the contest on behalf of the contest owner. Contests have a submission phase, a voting phase, and a results phase. During the submission phase, contestants submit video entries to be judged in the contest. During the voting phase, visitors to the video hosting site cast votes on some or all of the entered videos. During the results phase, the votes are tabulated and a winning video is determined. Alternative embodiments allow variations on each phase.

10 Claims, 10 Drawing Sheets

Fig. 2

Create a Contest

General Information — 202

- Name — 210 [ ]
- Tags — 212 [ ]
- Description — 214 [ ]
- URL — 216 [ ]
- Contest Icon: ⦿ Owner Selected — 218    ◯ Automatic — 220
- Type: ⦿ Votable by viewers — 222
  ◯ Juried by owner (no voting) — 224

226 — Terms & Conditions

Accepting Submissions — 204

- Start Date — 228 [ ]
- End Date — 230 [ ]
- Open To  [All Users ▼] — 232
- Video Entries — 234
  - ⦿ Viewable immediately
  - ◯ Viewable after approval
  - ◯ Viewable after approval and only during voting dates Voting — 206

- Start Date — 236 [ ]
- End Date — 238 [ ]
- Vote Counts — 240
  - [x] Viewable after video has been voted on
  - [x] Viewable after results have been announced Announcing Results — 208

- Date — 242 [ ]
- Determine Winners — 244
  - ⦿ Automatically -- based on votes
  - ◯ Manually -- based on owner selection
- Winner Labels — 246
  - [First Place]   First Place Label
  - [Second Place]  Second Place Label

[ Create Contest ] — 248

200

ACME Best Jingle Contest

Accepting Submissions | 0 Videos | 0 Discussions

ACME is looking for the best jingle you can think of. Submit a video of you performing a jingle, and you could win our contest! The Grand Prize is a trip to Germany.

Submit a Video

Contest Dates

Submissions:
December 6, 2007 – January 2, 2008

Voting:
January 3, 2008 – January 24, 2008

Results:
January 31, 2008

IMPLEMENTING VIDEO CONTESTS

CROSS-REFERENCE TO RELATED APPLICATIONS

This application claims the benefit of U.S. Provisional Application 60/868,929, filed on Dec. 6, 2006, and which is incorporated by reference herein in its entirety.

BACKGROUND

1. Field of the Invention

The present invention relates generally to providing contests on the Internet. In particular, the present invention is directed toward determining a winning video from among entries in a video contest.

2. Description of Background Art

Promoters of goods and services have historically used contests as a way of generating interest in their products. From the world-famous Miss America pageant, which began in 1921 as a way to boost tourism for Atlantic City, N.J.; to soft drink manufacturers that affix a prize-winning bottle cap to a single bottle of a nationally-distributed product; to a radio station giving away free tickets to listeners who call in at precisely the right moment following the playing of a specified song, contests remain immensely popular because of their ability to attract attention, to the benefit of the contest promoter.

SUMMARY

The present invention enables the popularity of contests to be advantageously implemented in the digital video space. A video hosting site allows a contest owner to specify parameters to be used for a contest. Examples of parameters include contest name, description, how the contest will be judged, who may enter the contest, etc. Once the parameters are set, a contest manager initiates the contest on behalf of the contest owner. Contests have a submission phase, a voting phase, and a results phase. During the submission phase, contestants submit video entries to be judged in the contest. During the voting phase, visitors to the video hosting site cast votes on some or all of the entered videos. During the results phase, the votes are tabulated and a winning video is determined. Alternative embodiments allow variations on each phase, as described below.

BRIEF DESCRIPTION OF THE DRAWINGS

FIG. 2 is a screen shot illustrating creation of a contest in accordance with an embodiment of the present invention.

FIG. 3 and FIG. 4 are screen shots illustrating a user interface for submitting a video contest entry in accordance with an embodiment of the present invention.

FIG. 8 and FIG. 9 are screen shots illustrating user interfaces for providing results of a video contest in accordance with an embodiment of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
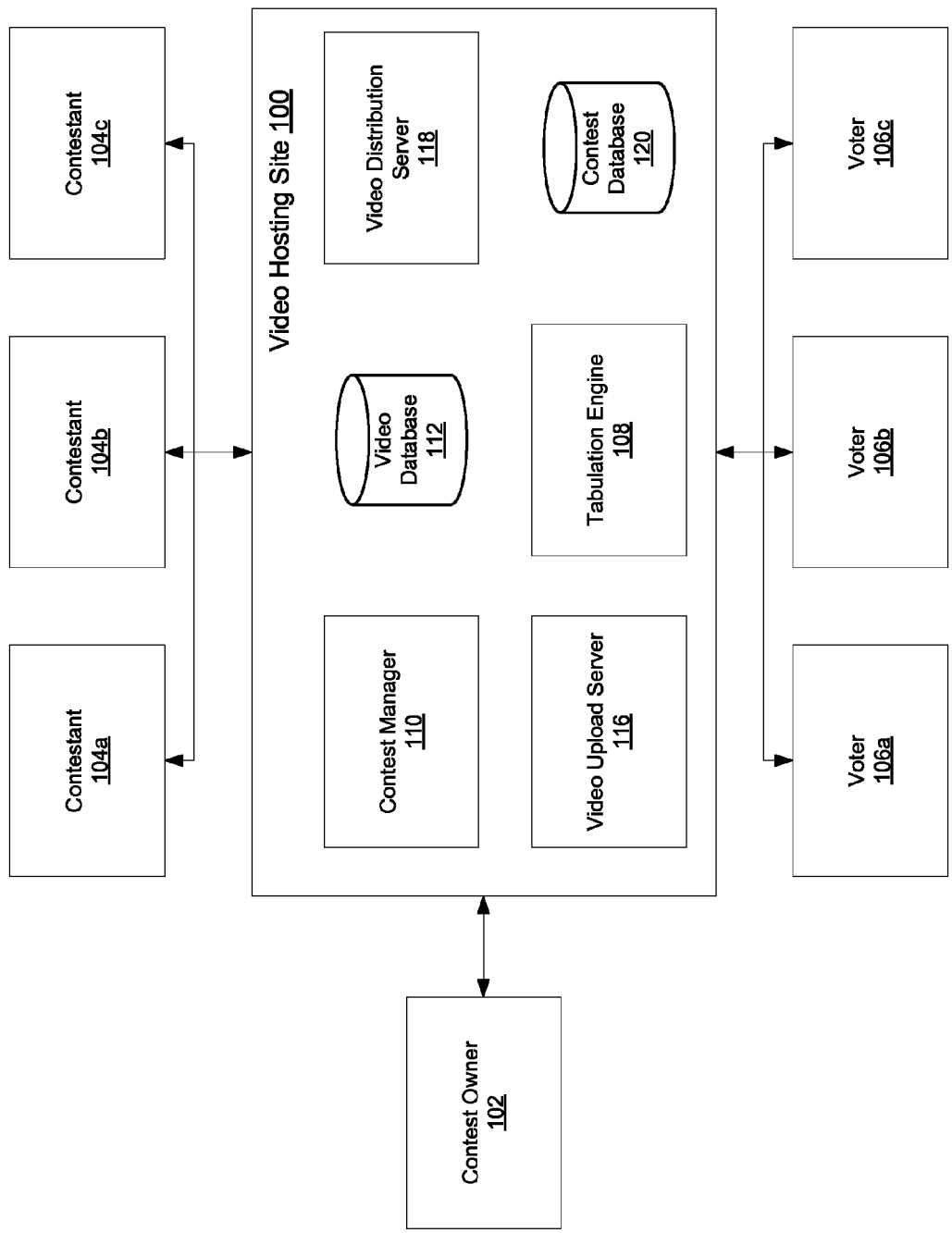
FIG. 1 is a block diagram of the overall architecture of an embodiment of the present invention.

FIG. 1 illustrates a video hosting site 100 for providing video contests in accordance with an embodiment of the present invention. Video hosting site 100 includes a video database 112 for storing videos, a contest manager 110 managing creation and operation of video contests, a tabulation engine 108 for tabulating votes cast for each video entered in the contest, a contest database for storing contest-related data, a video upload server 116 for receiving videos uploaded by contest owners 102, a video distribution server 118 for providing contest videos to voters 106.

Video hosting site 100 enables video contests to be implemented on a video hosting site accessible over a network such as the Internet. YouTube of San Bruno, Calif., is an example of a suitable video hosting site. In operation, the site includes many additional components related to uploading, downloading, streaming, pre- and post-processing and other analysis of videos not described here in an effort to maintain clarity, as those functions are not germane to the described invention.

In general, video hosting site 100 receives uploaded video content from content providers, including contestants, and allows content to be viewed by content viewers, including voters. Video content may be uploaded via the Internet from a personal computer, through a cellular network from a telephone or PDA, or by other means for transferring data over a network known to those of skill in the art. Video content may be downloaded in a similar manner; in one embodiment video content is provided as a file download to a content viewer; in an alternative embodiment, video content is streamed to the content viewer. The means by which video content is received by video hosting site 100 need not match the means by which it is delivered to a content viewer. For example, a content provider may upload a video via a browser on a personal computer, whereas a content viewer may view that video as a stream sent to a PDA.

Content viewers view video content on video hosting site 100 via a user interface. Typically, a viewer runs a web browser such as Microsoft Internet Explorer or Mozilla Firefox, and video distribution server 118 includes a web server such as Microsoft Internet Information Services. Using her browser, a viewer browses for content provided by video distribution server 118 and views content of interest, including video content.

A video contest may be run by the video hosting site 100, or it may be run by a user of the hosting site. For convenience, we use the term "Contest owner" to refer to the entity running the contest, whether it be the hosting site 100 or a user of the site.

In an embodiment of the present invention, when a user submits a video as an entry in a contest, the video is assigned an entry identifier, for example a number. The number may be serial—i.e. the third entry receives the number "3" as its identifier; it may be determined by a function; or it may be random.

In one embodiment, when the entry is viewed, the entry's identifier is displayed alongside the entry. An entry may be accessed directly via the user interface, if the identifier is known. For example, a web page on video hosting site 100 may include a search criteria for an entry identifier. A voter that would like to view entry number "55" enters "55" into the search field and submits the query. The entry having the identifier of "55" is then returned for viewing.

The operation of video hosting site 100 is considered in greater detail below.

When a contest owner 102 indicates that she is ready to create a contest, she is provided by contest manager 110 with a contest creation page 200 such as that illustrated in FIG. 2. Contest creation page 200 allows the contest owner 102 to enter information about the contest, including general information 202, submission acceptance information 204, voting information 206, and result announcement information 208.

General information section 202 allows contest owner 102 to specify a name 210 for the contest; to supply tags 212 that facilitate a search for the contest by would-be contestants; a description 214 of the contest; a URL 216 that the contest owner 102 would like to use for the contest page; a selection of a contest icon 218, which may be one provided by the owner 218, or determined automatically 220 by contest manager 110, for example by using an image associated with the contest owner's account on video hosting site 100. Contest owner 102 also can specify whether the contest will allow voting by viewers 222, or will instead be judged by the contest owner 224. A link 226 is also provided to allow contest owner 102 to review the terms and conditions of contests hosted by video hosting site 100.

The accepting submissions region 204 allows contest owner 102 to specify a start date 228 and end date 230 during which the contest will take place. The contest owner 102 can also specify using drop-down menu 232 whether the contest will be open to all users of video hosting site 100, or to only certain users, such as those specifically invited by contest owner 102, or those belong to pre-defined groups of users. Contest owner 102 can also specify at option 234 whether submissions should be viewable by others immediately, viewable only after approval by the contest owner 102 or her designee, or viewable after approval, but only during voting dates.

In voting region 206, the contest owner 102 can specify a start date 236 and end date 238 during which voting will take place. Contest owner 102 can specify in region 240 whether vote counts will be viewable by others as votes are received, or only after results have been announced. In one embodiment, the contest owner can prohibit votes from being viewed at all, e.g., by not selecting either option in region 240.

In the results section 208, the contest owner 102 specifies the date 242 on which results will be announced, as well as how winners will be determined 244—either automatically, based on the received vote counts, or manually, based on a selection by contest owner 102. Finally, the contest owner 102 can specify which labels 246 should be displayed next to the first place video and second place video after the results have been announced. In one embodiment, additional labels such as third place, fourth place, etc., can also be specified.

Once the contest owner has specified all of the information for contest creation, she submits the information to contest manager 110 by clicking on a "Create Contest" button 248.

Contest manager 110 then uses the received parameters to initialize a new contest. The contest parameters are associated with contest owner 102, and are stored in contest database 120. A contest web page 300 such as that illustrated in FIG. 3 is automatically created in one embodiment at the URL specified by contest owner 102 in region 216 of the contest creation page 200. Contest web page 300 provides the contest name 302, status 304, and relevant contest dates 306. A "submit a video" button 308 invites viewers to submit an entry to the contest. In one embodiment, web page 300 also includes a link 310 to a discussions board, maintained by video hosting site 100, where users of the site can discuss the contest and related entries. Finally, web page 300 includes a link 312 to a list of videos that have been entered into the contest (subject to the parameters specified in region 234 of the contest creation page). In the illustrated case of FIG. 3, no videos are available for viewing, since the contest was just created.

Figure 4:
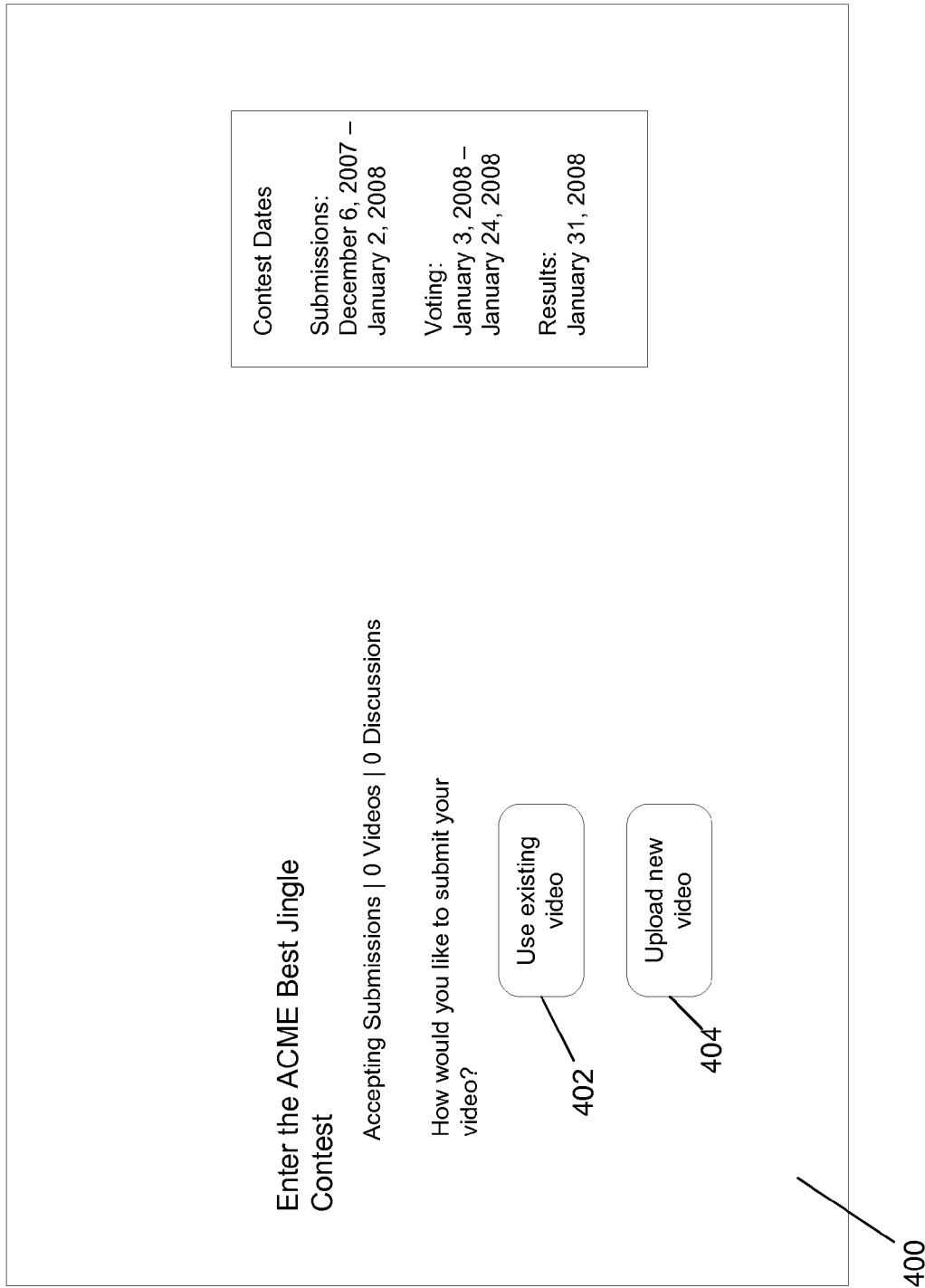
Figure 5:
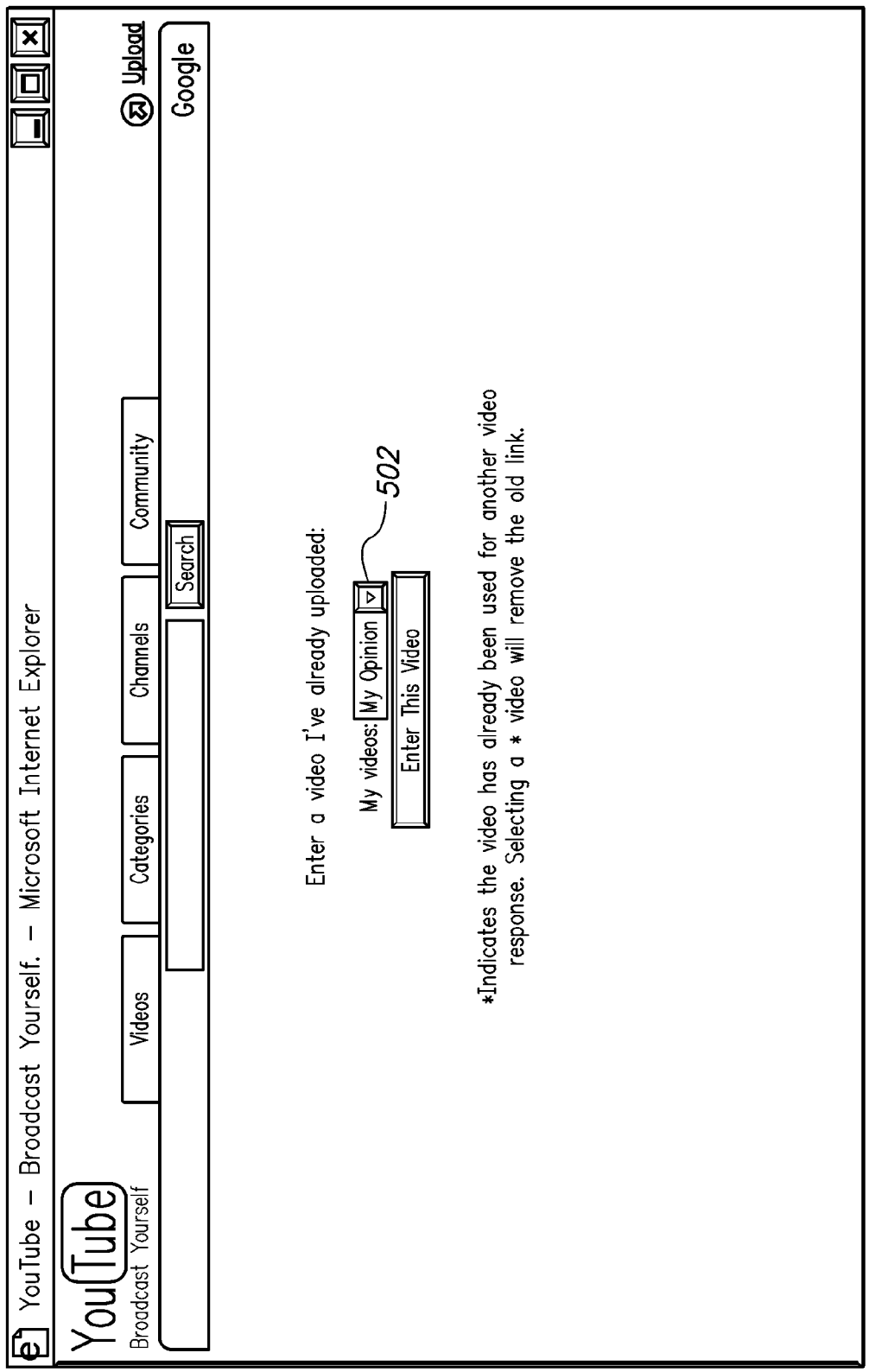
FIG. 5 is a screen shot illustrating a user interface for submitting a previously-uploaded video as a contest entry in accordance with an embodiment of the present invention.
Figure 6:
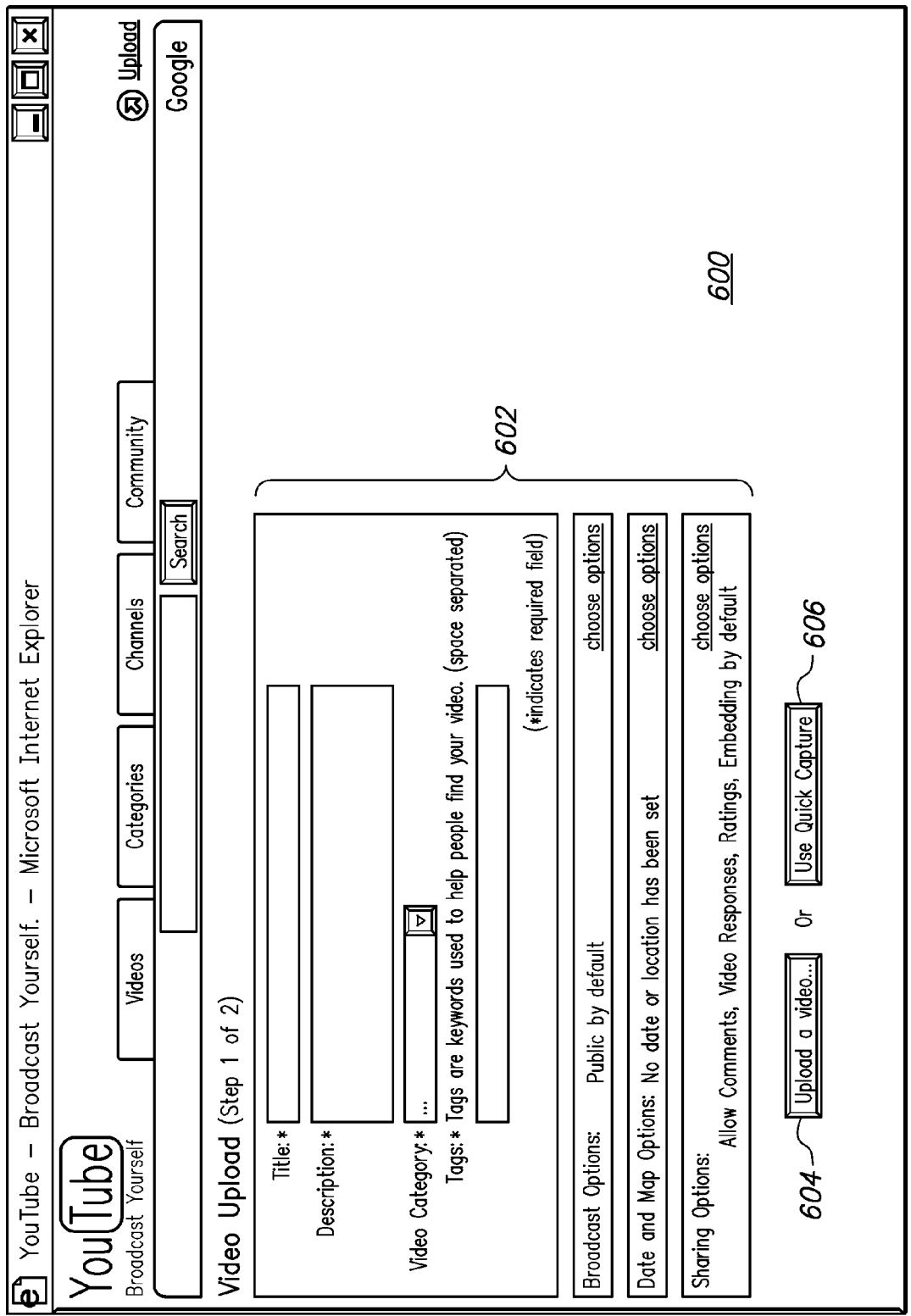
FIG. 6 is a screen shot illustrating a user interface for uploading a video contest entry in accordance with an embodiment of the present invention.

To submit a video entry, a contestant 104 selects the "submit a video" button 308. The contestant 104 is then presented with a web page 400 such as that in FIG. 4. In the illustrated embodiment, a contestant 104 can submit an existing video that she previously uploaded to hosting site 100 and stored in video database 112, or she may upload a new video. Two buttons 402, 404, allow the contestant 104 to indicate whether to use an existing video or upload a new one.

If the contestant indicates that she would like to use an existing video, i.e. by clicking button 402, a web page 500 is presented from which contestant 104 can select a previously uploaded video from a drop-down box 502.

Alternatively, if the contestant 104 chooses to upload a new video by selecting button 404, a web page 600 is presented. Web page 600 allows contestant 104 to fill in descriptive information 602 about the video being entered, such as its title, description, category, tags, and the like. In one embodiment, privacy parameters may be set by contestant 104 for the video, e.g., so that only the contest owner 102 can see the video; in alternative embodiments any video entered in the contest is automatically made publicly available.

Once the contestant has entered the descriptive information 602, she may choose either to upload a video from her computer by selecting button 604, or she may indicate that she would like to record a video in real time using a video input device by selecting button 606.

Once the video has been uploaded to video upload server 116, it is stored in video database 112, and contest manager 110 stores an association in contest database 120 between the uploaded video and the contest it was entered into. In one embodiment, the uploaded video is also made available for distribution to the public by video distribution server 118 outside of the contest context, e.g., being viewable in the same manner as a stored video that is not part of a contest. In one embodiment a page on which the video is viewed includes indicia that the video is part of a contest. The indicia may include a link to the contest web page 300.

Figure 7:
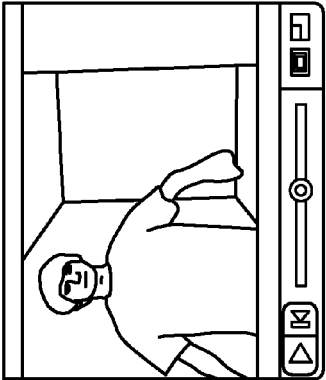
FIG. 7 is a screen shot illustrating a user interface for voting on a contest entry in accordance with an embodiment of the present invention.

Once the voting time window arrives, voters 106 may vote on videos in the contest. Voters may discover a contest by browsing video hosting site 100 for a list of contests, searching for a specific contest, or coming randomly upon a video that indicates it is part of a contest. FIG. 7 illustrates a web page 700 suitable for receiving contest votes in accordance with an embodiment of the present invention. In the illustrated embodiment, when a voter 106 arrives at the contest voting page, a main video 702 is presented. The main video 702 is the video that is to be voted on, and is selected randomly from among all videos in video database 112 that are entered into the contest. In an alternative embodiment, a voter enters a specific URL or follows a link from a specific entry's page in order to vote on a desired video. Web page 700 includes descriptive information 704 about the video 702, including the entry number 716 of the video, a contest status indicator 706, and voting buttons 708, 710. In one embodiment, web page 700 includes a banner 712 or other advertisement placed by contest owner 102. In one embodiment, web page 700 also displays a set 714 of other videos entered in the contest. A voter can immediately access any of the other displayed videos by clicking on the desired video.

To vote, the voter 106 selects one of the voting buttons 708, 710. In the illustrated embodiment, the voter's choices are "I like it!" 708 and "Not so much" 710, accompanied by a thumbs-up sign and thumbs-down sign, respectively. Many other rating methods may be employed in other embodiments, examples including a star rating system, a numerical rating system, a comparative rating system (e.g., "this is my favorite video", "this is my least favorite video", etc.), and the like.

In one embodiment, a voter 106 must be logged in to video hosting site 100 before being allowed to cast a vote in order to prevent a single voter from voting multiple times for the same video. In an alternative embodiment, when a voter votes on a video, a cookie is placed on the voter's computer to indicate that the vote has taken place and prevent future voting on the same video.

Tabulation engine 108 receives votes from voters 106 and keeps track of the score for each video in the contest. In one embodiment, once voting has begun a video's score is displayed along with the video. In an alternative embodiment, the video's score is hidden during the voting period. At the end of the voting period, the score for each video is tabulated in order to select a contest winner.

A video's score in one embodiment is the total number of positive votes it receives. In another embodiment, its score is the number of positive votes received, minus the number of negative votes it receives. In an another embodiment, tabulation engine 108 normalizes the voting score based on the number of views a video has received—e.g., a video with 51 positive votes and 49 negative votes should score less favorably than a video with 9 positive votes and 1 negative vote. As will be appreciated by those of skill in the art, these and many other scoring algorithms may be employed to determine a score for each video.

Once the tabulations are complete, a winning video is determined. In one embodiment, the winning video is the video with the highest tabulated score. In one embodiment, runners-up are also determined, i.e., second-highest score, third-highest score, etc. In an alternative embodiment, contest owner 102 manually selects the winner of the contest. This may be done with regard to the votes received for each video, including any weightings or other scoring applied by tabulation engine 108, but need not be.

Figure 8:
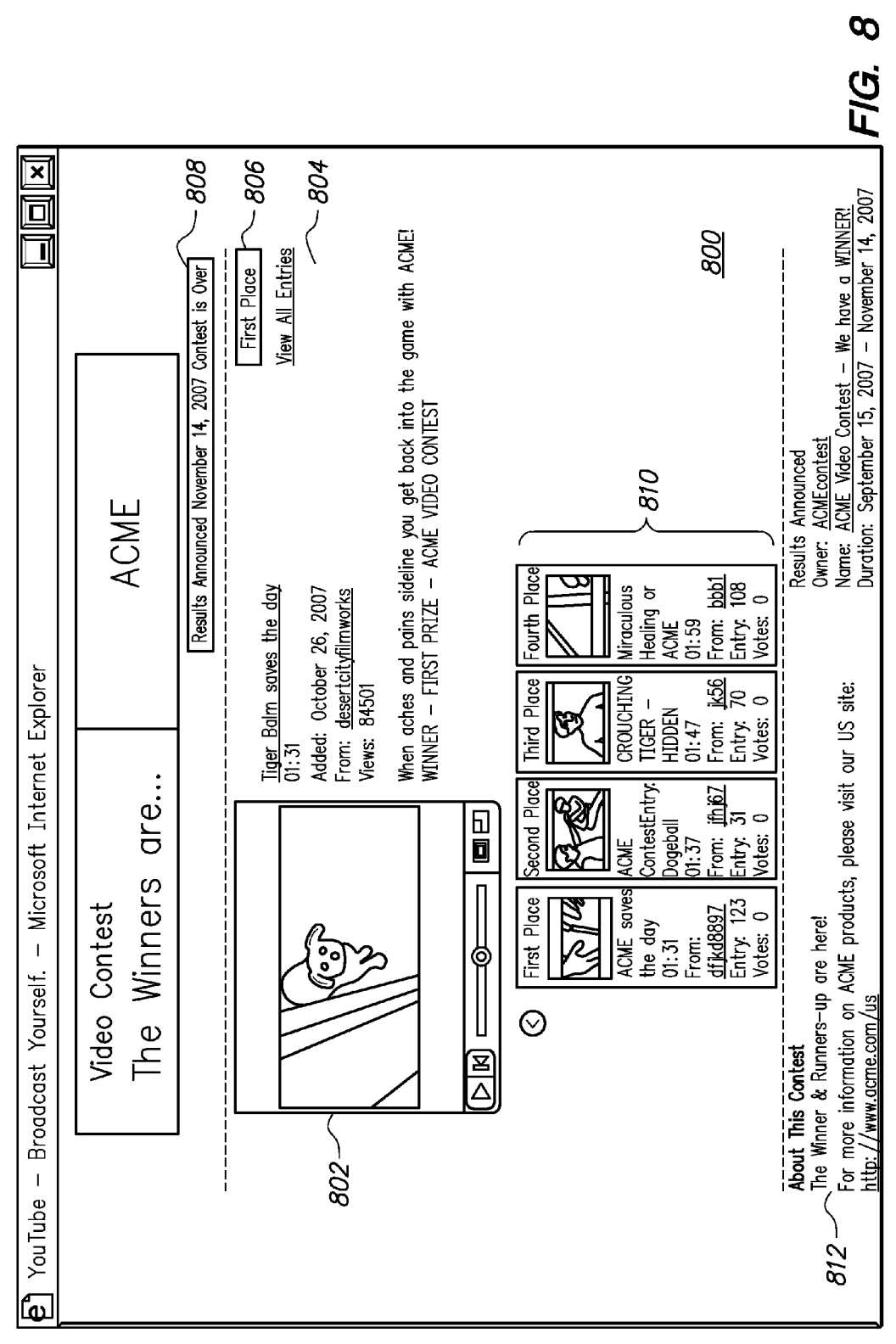
Figure 9:
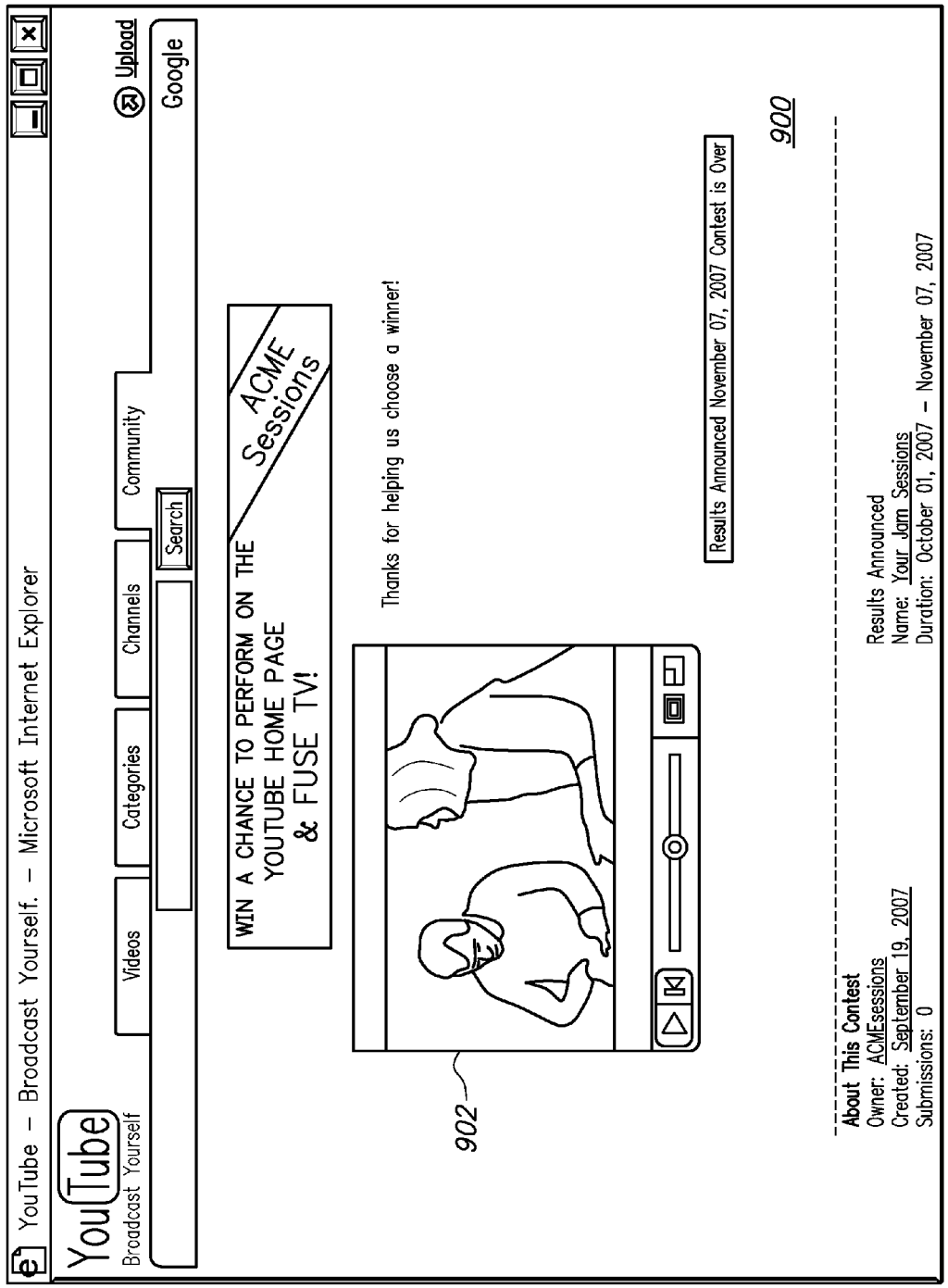

In one embodiment, results of the contest are made available on the contest web page 800 as in FIG. 8. FIG. 8 includes the winning video, as well as descriptive information 804 about the winning video. A "First Place" emblem 806 announces that the video 802 has received the first place award. A status indicator 808 indicates the status of the contest ("Results Announced", in this case). Thumbnail links 810 to the second, third and fourth-place winners are also provided in one embodiment. An "About this contest" area 812 displays the description of the contest previously supplied by contest owner 102. In one embodiment (not shown), the total votes received by each of the displayed videos is also included. FIG. 9 illustrates another embodiment in which the runner-up videos are not displayed.

Figure 10:
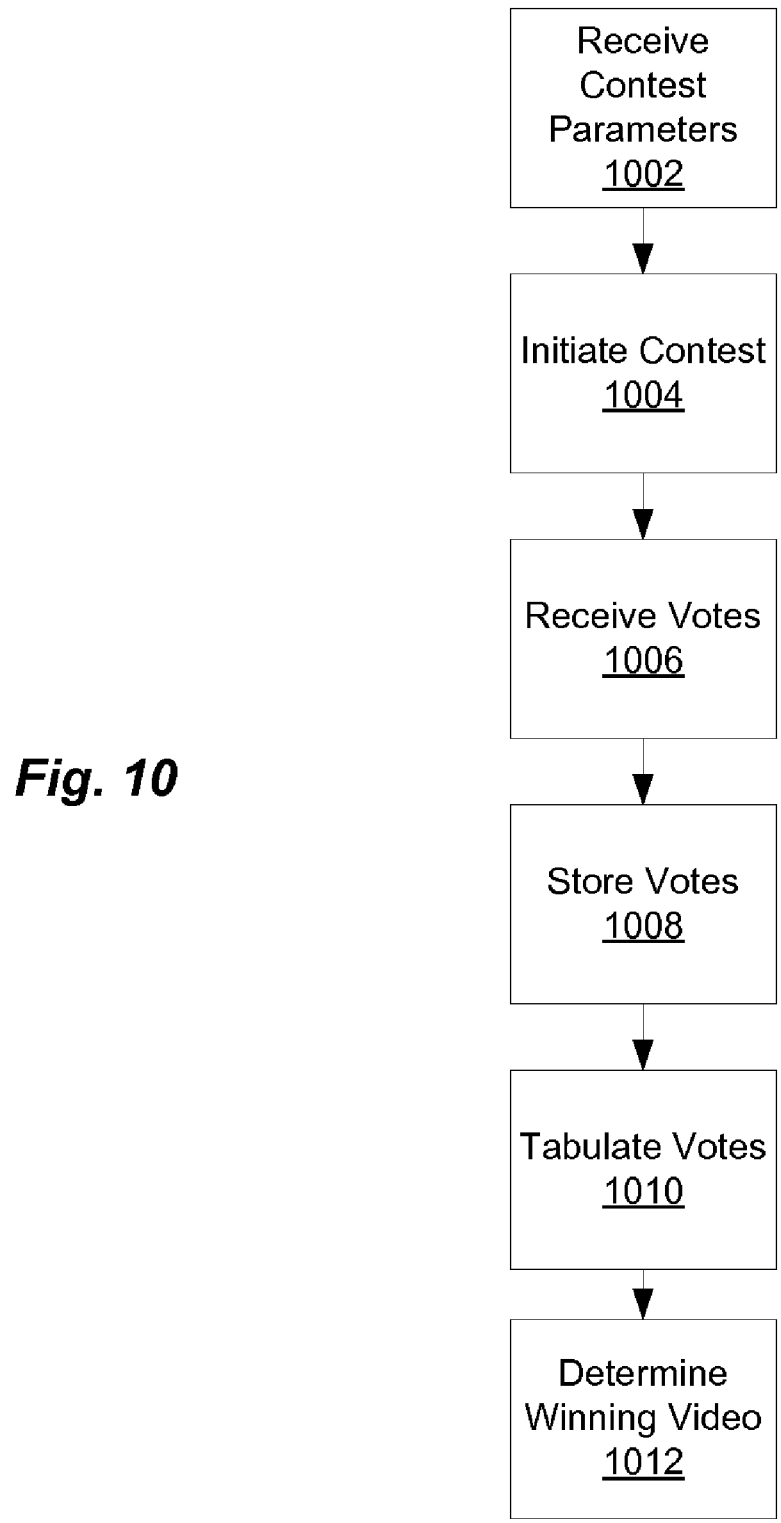
FIG. 10 is a flow chart illustrating a method for providing video contests in accordance with an embodiment of the present invention.

FIG. 10 illustrates a method for providing video contests in accordance with an embodiment of the present invention. Initially, contest manager 110 receives 1002 contest parameters from contest owner 102. Content manager 110 then initiates 1004 the contest with the specified parameters. Video hosting site 100 receives 1006 votes from voters 106, and tabulation engine 108 stores 1008 the votes in contest database 120. Following the end of the voting period, tabulation engine 108 tabulates 1010 the received votes to determine a score for each video. From the scores, tabulation engine 108 then determines 1012 which is the winning video.

In one embodiment, a voter 106 can subscribe to a contest owner's contests—that is, the voter can ask to be notified by video hosting site 100 whenever there is a change in a contest belonging to a specific contest owner, e.g., when voting opens or closes, or when results are announced. In addition, a voter can be notified when that contest owner begins a new contest. Notification by video hosting site 100 may be, for example, via e-mail, telephone or postal mail, or by a notification to the voter 106 when the voter logs on to video hosting site 100.

In one embodiment, contest owner 102 integrates the contest on a web site associated with the contest owner. For example, contest owner 102 may have a page on its web site, or a portion of a page, on which contest videos are displayed via an embedded video player calling back to contestant videos located at video hosting site 100. Visitors to the contest owner's web site can vote as described above, and data is passed back to video hosting site 100 for tabulation and scoring.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the content server 104 may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for hosting a video contest on a video hosting website, the method comprising:
   receiving a request from a user of the video hosting website to create a video contest;
   receiving, from the user, contest parameters for the video contest, the contest parameters comprising at least a submission period that is less than a duration of the video contest, a voting period that is less than the duration of the video contest, and an indication that a winning video contest entry is determined based on votes;
   initiating the video contest at the video hosting site based at least in part on the received contest parameters;
   receiving, from a plurality of contestants of the video contest during the submission period, video contest entries for the video contest, each entry provided by one of the plurality of contestants;
   receiving, during the voting period, votes for a plurality of the video contest entries from a plurality of additional users of the video hosting website;
   tabulating the received votes;
   automatically determining the winning video contest entry based on the tabulated votes; and
   providing an indication of the winning video content entry.

2. The method of claim 1 further comprising displaying an indication of the winning video contest entry on the video hosting site.

3. The method of claim 1 further comprising determining a second-place video contest entry based on the tabulated votes.

4. The method of claim 1 wherein each contestant is a registered user of the video hosting site.

5. A computer-implemented method for conducting a video contest on a video hosting website, the method comprising:
   receiving a request from a contest owner who is a user of the video hosting website to create a video contest;
   receiving, from the contest owner, contest parameters for the video contest, the contest parameters including a submission period that is less than a duration of the video contest and an indication that a winning video contest entry is manually selected by the contest owner;
   initiating the video contest at the video hosting site based at least in part on the received contest parameters;
   receiving, from a plurality of contestants of the video contest during the submission period, video contest entries for the video contest, each entry provided by one of the plurality of contestants;
   receiving, from the contest owner, a manual selection of the winning video contest entry from the video contest entries after the submission period has ended, the manual selection not based upon a vote by the contest owner and other users; and
   providing an indication of the winning video contest entry.

6. A computer system for hosting video contests, comprising:
   a processor; and
   a computer-readable storage medium storing computer code that when executed by the processor:
      receives a request from a user of the system to create a video contest;
      receives, from the user, contest parameters for the video content, the contest parameters comprising at least a submission period that is less than a duration of the video contest, a voting period that is less than the duration of the video contest, and an indication that a winning video contest entry is determined based on votes; and
      initiates the video contest on a video hosting site based at least in part on the received contest parameters;
      receives, from a plurality of contestants of the video content during the submission period, video contest entries for the video content, each entry provided by one of the plurality of contestants;
      receives, during the voting period, votes for a plurality of the video contest entries from a plurality of other users of the video hosting website;
      tabulates the received votes;
      automatically determines the winning video contest entry based on the tabulated votes; and
      provides an indication of the winning video content entry.

7. The system of claim 6 further comprising a video database that stores the video contest entries received for the video contest.

8. The system of claim 6 wherein the computer code when executed by the processor further stores contest data.

9. The system of claim 8 wherein contest data includes a contest identifier, a contest name, the user associated with the creation of the video contest, and voting data associated with the contest.

10. A computer program product having a non-transitory computer-readable storage medium having computer executable code for hosting video contests on a video hosting website, the code when executed:

receives a request from a user of the video hosting website to create a video contest;

receive, from the user, contest parameters for the video contest, the contest parameters comprising at least a submission period that is less than a duration of the video contest, a voting period that is less than the duration of the video contest, and an indication that a winning video contest entry is determined based on votes;

initiates the video contest at the video hosting site based at least in part on the received contest parameters;

receives, from a plurality of contestants of the video contest during the submission period, video contest entries for the video contest, each entry provided by one of the plurality of contestants;

receiving, during the voting period, votes for a plurality of the video contest entries from a plurality of other users of the video hosting website;

tabulate the received votes;

automatically determine the winning video contest entry based on the tabulated votes; and provide an indication of the winning video content entry.

* * * * *